Dec. 9, 1941. E. C. AVERY ET AL Re. 21,969

HEATING SYSTEM CONTROL

Original Filed July 16, 1938

INVENTORS
FRED H. GLEASON
EDWARD C. AVERY
BY
Theodore E. Simonton
ATTORNEY

Reissued Dec. 9, 1941

Re. 21,969

UNITED STATES PATENT OFFICE 21,969

HEATING SYSTEM CONTROL

Edward C. Avery and Fred H. Gleason, Auburn, N. Y., assignors to Gleason-Avery, Inc., Auburn, N. Y., a corporation of New York Original No. 2,147,231, dated February 14, 1939, Serial No. 219,554, July 16, 1938. Application for reissue December 27, 1939, Serial No. 311,211

2 Claims. (Cl. 236—46)

This invention relates to improvements in controls for heating systems, and is more particularly concerned with a control for a domestic heating system employing an automatic coal stoker of the type having two rates of feed or operation, a low rate of feed when the dwelling thermostat is satisfied and a high rate of feed when the dwelling thermostat is calling for heat.

Domestic heating systems of the foregoing type are in common use today, and in them the automatic stoker runs continuously throughout the heating season, either at the high rate of feed or at the low rate of feed, depending upon the condition of the dwelling thermostat or thermostats. One of the better known automatic stokers of this type, and to which the control system of our invention is particularly although not exclusively applicable, is sold under the trade name "Electric Furnace Man." With such systems, on mild days in spring and fall, the dwelling frequently becomes overheated because of continuous operation of the furnace, which term is used herein generically to include a hot air furnace, boiler or other domestic heating plant, at the low rate of the feed of the stoker.

The principal object of our invention is to provide a control for a heating system of the type described which will overcome the disadvantage just mentioned and effect a saving in fuel consumption, and which is simple in construction, and positive and efficient in operation.

More specifically, it is an object of our invention to provide a dual control for the fuel feeding mechanism of a stroker fed furnace of the type described, whereby the stoker will be operated at the high rate of feed when the dwelling thermostat is calling for heat, and when the dwelling thermostat is satisfied, the stoker will be operated intermittently on a predetermined time schedule at the low rate of feed, which time schedule may be so selected as to be just capable of maintaining the fire to prevent its extinguishment.

Other objects and advantages of this invention will be apparent from the following description when taken in connection with the accompanying drawing, in which.

Figure 1:
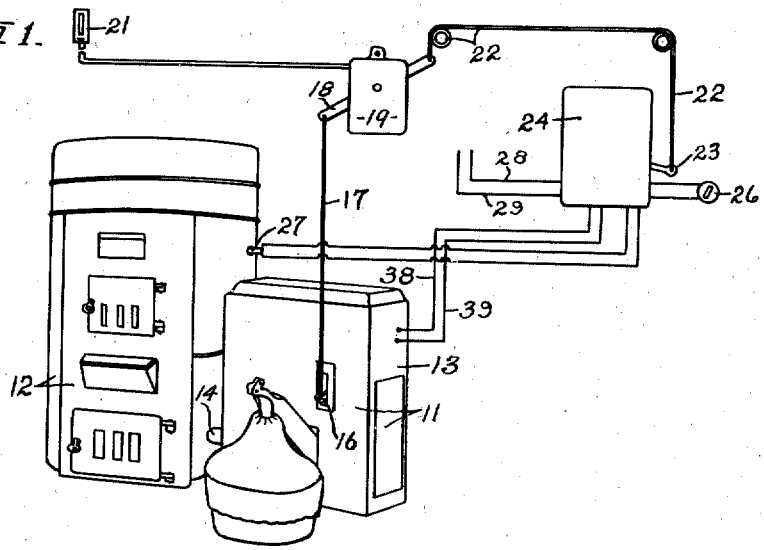
Figure 1 is a diagrammatic view showing a stoker fed furnace with our control system applied thereto.

The control system of our invention is adapted to control the operation of a stoker, generally indicated by the numeral 11, which feeds fuel to a furnace generally indicated by the numeral 12. While the control system of our invention may be used to regulate the operation of other types of stokers, it is, as stated above, particularly adapted for use in connection with that type of domestic stoker known as the "Electric Furnace Man."

In general, the stoker may comprise a housing 13 which encloses the driving mechanism for the stoker and to which coal is fed preferably by a screw conveyor extending into the coal bin. From the housing 13 the fuel is fed through a tube 14 by a screw conveyor to the fire pot in the furnace.

The stoker feed regulating arm 16 is connected by a cord or chain 17 to a pivotally-mounted control arm 18 operated by a control motor 19, which in turn is actuated in accordance with the condition of a thermostat 21. The control motor 19 and the thermostat 21 have been shown only diagrammatically, since they constitute no part of our present invention and standard mechanisms of the type required are well known in the art to which this invention applies. It is sufficient to state that the thermostat 21, mounted in the rooms to be heated, is adapted to cause operation of the control motor 19 in accordance with the heat requirements of the rooms. The control motor 19 operates the control arm 18 and thereby moves the feed regulating arm 16 from the low fuel feed positions, illustrated in Figure 1, to a high fuel feed position in which the arm 16 is moved upward from the position shown in Figure 1. It will be understood that the arm 16 is in the low feed position when the thermostat 21 is satisfied, and is moved to the high feed position when the thermostat 21 is calling for heat.

The thermostat 21 is conveniently positioned in the dwelling or other building at a point where the temperature maintained will more or less control the temperature throughout the building or, if desired, individual thermostats can be placed in the separate rooms and additional mechanism provided to enable heat to be supplied to the room desired in accordance with practices well known in the art. For the purpose of the present invention, a single thermostat will suffice to illustrate the operation of our control system.

The parts so far described are conventional in heating systems of the type under consideration, and the electric motor which drives the stoker would ordinarily be connected directly to the power lines so as to be running continuously throughout the operation of the heating system. According to our invention, however, we introduce additional controls which will now be described.

Figure 2:
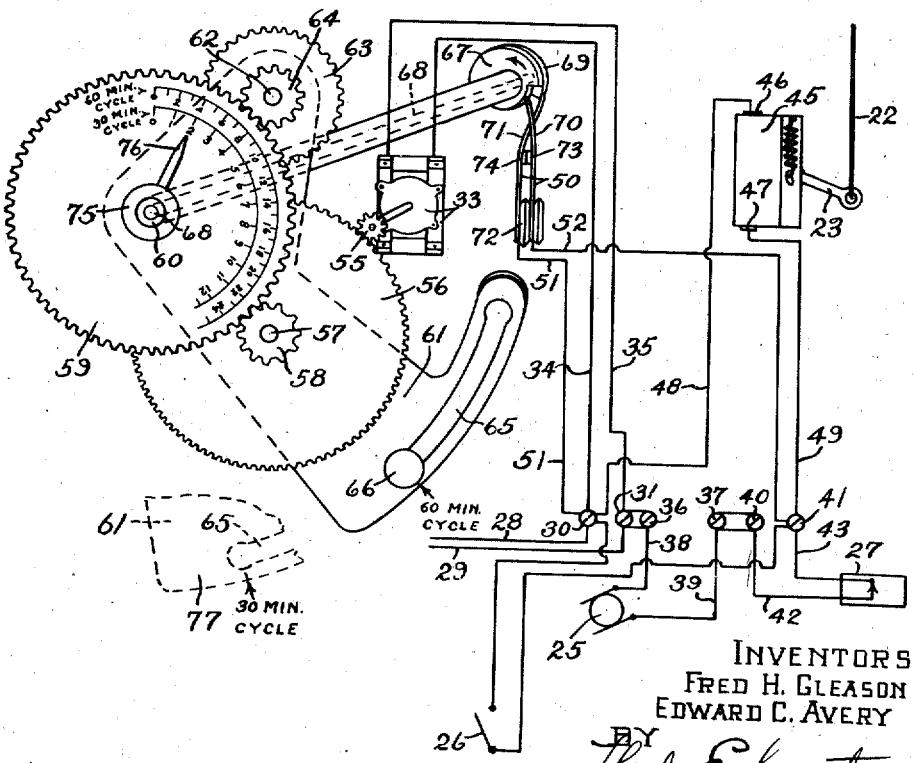
Figure 2 is a diagrammatic view showing parts of our control system, including timing mechanism for controlling the intermittent operation of the stoker at the low rate of feed when the dwelling thermostat is satisfied.

The arm 18 is adapted to operate, through a pulley and cord assembly 22, a switch lever 23 which projects from a housing 24. The housing 24 contains the timing mechanism of our invention which is illustrated in Figure 2, and all of the parts shown in Figure 2 are in practice mounted within the housing 24 except the stoker motor 25, the manual switch 26 and the limit switch 27, the functions of which will be pointed out hereinafter. Leads 28 and 29 supply electric power, usually from a 110 volt 60 cycle alternating current source, to the control system.

Referring now more particularly to Figure 2, power supply leads 28 and 29 are connected to terminal posts 30 and 31 located within the housing 24. A synchronous motor 33, which drives the timing mechanism, is connected across the terminals 30 and 31 by leads 34 and 35. The stoker motor 25 is connected to terminal posts 36 and 37 by leads 38 and 39, and the limit switch 27 is connected to terminal posts 40 and 41 by leads 42 and 43, all of these terminals being likewise located within the housing 24. Terminal posts 31 and 36, and 37 and 40, respectively, are connected together by tie bars, as illustrated.

The switch lever 23 serves to operate a normally open, single pole, single throw switch 45 which may be of the spring-biased snap action type which is normally retained by its spring in the open position illustrated in Figures 1 and 2. The switch 45 is provided with two terminals 46 and 47 which are connected across the terminal posts 30 and 41 by leads 48 and 49. A cam actuated switch 50 which is controlled through a timing mechanism driven by the synchronous motor 33 and to be presently described, is likewise connected across the terminal posts 30 and 41 by leads 51 and 52, and hence is in parallel with the switch 45. The manual switch 26 is also connected across the terminal posts 30 and 41.

It will be seen from the foregoing that the stoker motor 25 is connected to the power supply leads 28 and 29 in series with the limit switch 27 and the switches 26, 45 and 50, which last three switches are in parallel to each other. The limit switch 27 is shown in Figure 1 as being mounted in the furnace 12 in a manner well known in the art to which this invention relates, and serves to break the circuit through the stoker motor 25 when the furnace becomes overheated. When the manual switch 26 is closed, the switches 45 and 50 are short-circuited, and the control system of our invention is rendered inoperative, whereupon the stoker operates in the customary manner of the prior art, the rate of feed of the stoker being controlled by the thermostat 21, control motor 19 and feed regulating arm 16 as described above. When the manual switch 26 is open, however, the control system of our invention is superimposed upon the conventional control system and operates as described below.

According to our invention, the synchronous motor 33 drives a pinion 55 which in turn drives a gear 56 on a shaft 57. On the shaft 57 is also mounted a pinion 58 which meshes with a gear 59 mounted on a shaft 60 carried by a mounting plate (not shown). There is thus accomplished a speed reduction so that the shaft 60 is driven slowly. The shaft 57 is mounted on a bracket 61 pivoted on the shaft 60 to swing about said shaft as an axis. The bracket 61 also carries a shaft 62 upon which is mounted a gear 63 and a pinion 64. The bracket 61 has an arcuate slot 65 with which is adapted to register a thumb screw 66 which extends into the mounting plate.

The face of the gear 59 has two sets of graduations, as shown, the graduations indicating minutes. On the shaft 60 is mounted a cam 67. On a shaft 68, extending through a bore in shaft 60, is mounted a second cam 69. The cams 67 and 69, both of which are driven by the shaft 60, are engaged by spring arms 70 and 71, respectively. The spring arms 70 and 71 are suitably mounted upon an insulating support indicated at 72, and carry contacts 73 and 74. The spring arms 70 and 71 with their contact 73 and 74 comprise the cam-actuated switch 50 previously mentioned.

On the end of the shaft 68 is a thumb wheel 75 to which is connected a pointer 76. Upon rotating the thumb wheel 75, the cam 69 may be moved with respect to the cam 67 so as to adjust the cams with respect to each other. When the spring arm 70 rides on the low point of the cam 67 and the spring arm 71 rides on the high point of the cam 69, the contacts 73 and 74 are in engagement so as to close the circuit across the terminal posts 30 and 41 from the power supply lead 29 through the stoker motor 25, the limit switch 27 and back to the power supply lead 28, so that the stoker motor is operated for the period for which the pointer 76 has been set.

With the setting shown in Figure 2, the stoker motor is operated on a sixty minute cycle, in such manner that the stoker motor will be operated four minutes in every sixty minutes. When the thumb screw 66 is loosened and the bracket 54 swung around its pivot to the dotted line position indicated at 77 in Figure 2, the gear 56 is swung out of engagement with the pinion 55 and the gear 63 swung into engagement with that pinion. The motor is then operated on a thirty minute cycle, so that, with the setting of the pointer 76 shown in Figure 2, the stoker motor will operate two minutes in every thirty minutes.

It will thus be apparent that with the time control described and with the manual switch 26 open, the stoker motor 25 does not operate continuously when the thermostat 21 is not calling for heat, but, during this period of lack of demand for heat from the thermostat, depending upon the setting of the bracket 61 and the pointer 76 of the timing mechanism, the stoker motor will be operated for a predetermined period of time at predetermined intervals at the low rate of feed. The time should be so determined by experiment as to be just sufficient to prevent the extinguishment of the fire but to develop practically no heat, thereby preventing over-runs of temperature in the heated space above the thermostat setting. Should the thermostat 21 call for heat, the arm 18 will swing clockwise, raising the switch lever 23 through the pulley and rope assembly 22 and thereby close the stoker motor circuit through the switch 45 to operate the stoker continuously at the high fuel feed rate dictated by the corresponding upper position of the arm 16, until the demand for heat by the thermostat is satisfied. The arm 18 will then swing back to its original position, lowering the arm 16 and the arm 23, and the stoker motor circuit will be broken at the switch 45, and the stoker motor operated intermittently by the switch 50 and the timing mechanism as above described.

It will be particularly noted that the stoker motor may be operated continuously during periods of cold weather by closing the manual switch 26, so that the stoker will feed fuel continuously either at a high feed rate or at a low feed rate, depending upon the demands of the thermostat 21. When the weather is warm, as in the spring and fall, the manual switch 26 may be opened, and the starting and stopping of the stoker motor will be under the control of the timing mechanism except when the thermostat 21 calls for heat.

The system may, if desired, be operated throughout the entire heating season under the control of the timing mechanism, and this we have found to be the most economical operation, as even during periods of relatively cold weather there are times when for several hours the thermostat will not demand heat, and a considerable saving in fuel is effected by operating the stoker motor merely intermittently to supply sufficient fuel to prevent extinguishment of the fire. Only a slight amount of experimenting is required to ascertain the proper setting of the pointer 76 and the bracket 61, so that sufficient fuel is fed to the furnace to prevent extinguishment of the fire.

It will be apparent that various changes in the form and relation of the parts of our invention may be made without departing from the spirit of the invention as set forth in the appended claims.

We claim:

1. An interval timer for a thermostatically controlled, electric motor-driven stoker of the type having a variable feed rate, said thermostatic control including means for obtaining a high rate of feed when the thermostat demands heat and a low rate of feed when the thermostat is satisfied, comprising in combination, a switch adapted to be connected in the stoker motor circuit and adapted to be closed when said thermostat demands heat, a synchronous electric motor, a speed reducing mechanism driven thereby, means for selectively varying the speed reduction effected by said mechanism, a shaft driven by said speed reducing mechanism, two cams mounted on said shaft for rotation therewith, means for changing the relative positions of said cams with respect to each other, and a second switch in parallel to said first switch and having two arms each operated by one of said cams, whereby said second switch will be closed for such part of each revolution of said shaft as may be determined by the setting of said cams.

2. A stoker control system for maintaining a fire by means of timed periodic operation at a low rate of feed of the stoker in a heating system comprising a furnace, an electric motor and a motor circuit for operating said stoker, and means including a thermostat controlled by the temperature of the space to be heated for automatically adjusting said stoker to a high rate of feed when the thermostat demands heat and automatically adjusting said stoker to a low rate of feed when the thermostat is satisfied, a normally opened switch in said motor circuit, means operated by said thermostat controlled means for closing said switch when said thermostat demands heat, a second switch in said motor circuit in parallel to said first switch, a timing mechanism, and means operated by said timing mechanism for periodically closing said second switch for predetermined intervals of time, said timing mechanism and means operated thereby including a synchronous electric motor, a speed reducing gear train driven thereby, means for shifting said gear train to obtain different speed reductions, and adjustable cam means driven by said gear train for regulating the periods of closing of said second switch, thereby intermittently operating said stoker motor at said low rate of feed when said thermostat is satisfied.

FRED H. GLEASON.
EDWARD C. AVERY.